(12) United States Patent
Evans

(10) Patent No.: US 8,478,855 B1
(45) Date of Patent: Jul. 2, 2013

(54) APPLICATION CONTROL TRANSLATION

(75) Inventor: Ethan Z. Evans, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 169 days.

(21) Appl. No.: 13/172,503

(22) Filed: Jun. 29, 2011

(51) Int. Cl.
*G06F 15/173* (2006.01)

(52) U.S. Cl.
USPC ............................ 709/223; 709/205; 709/231

(58) Field of Classification Search
USPC .......................................... 709/223, 205, 231
See application file for complete search history.

(56) References Cited

U.S. PATENT DOCUMENTS

| | | | | |
|---|---|---|---|---|
| 7,925,734 | B2 * | 4/2011 | Leduc ........................... | 709/223 |
| 7,975,051 | B2 * | 7/2011 | Saint Clair et al. ........... | 709/225 |
| 8,170,701 | B1 * | 5/2012 | Lu .................................. | 700/94 |
| 8,301,270 | B2 * | 10/2012 | Quail .............................. | 700/17 |
| 2007/0032247 | A1 * | 2/2007 | Shaffer et al. .............. | 455/456.1 |
| 2010/0057840 | A1 * | 3/2010 | Schlusser ...................... | 709/203 |
| 2010/0191352 | A1 * | 7/2010 | Quail .............................. | 700/90 |
| 2011/0113121 | A1 * | 5/2011 | Sarkar ........................... | 709/218 |
| 2011/0276722 | A1 * | 11/2011 | Balestriere et al. ........... | 709/246 |
| 2012/0013547 | A1 * | 1/2012 | Tsirkin et al. .................. | 345/173 |
| 2012/0030394 | A1 * | 2/2012 | Bird ............................... | 710/305 |
| 2012/0144053 | A1 * | 6/2012 | Futty et al. .................... | 709/231 |
| 2012/0245918 | A1 * | 9/2012 | Overton et al. ................ | 703/27 |
| 2012/0277003 | A1 * | 11/2012 | Eliovits et al. ................. | 463/42 |

OTHER PUBLICATIONS

U.S. Patent Application entitled "Sending Application Input Commands over a Network" filed Dec. 15, 2010 and assigned U.S. Appl. No. 12/968,845.
U.S. Patent Application entitled "Remotely Emulating Computing Devices" filed May 24, 2011 and assigned U.S. Appl. No. 13/114,534.

* cited by examiner

*Primary Examiner* — Firmin Backer
*Assistant Examiner* — Jonathan Bui
(74) *Attorney, Agent, or Firm* — Thomas | Horstemeyer, LLP

(57) ABSTRACT

Disclosed are various embodiments that facilitate translation of application controls. An application is executed in a hosted environment that virtualizes a first input device for the application. A video signal generated by the application is encoded into a media stream, which is sent to another computing device. Input data that is generated in a second input device of the other computing device is obtained from the other computing device. A translated form of the input data is provided to the application through the first input device.

22 Claims, 8 Drawing Sheets

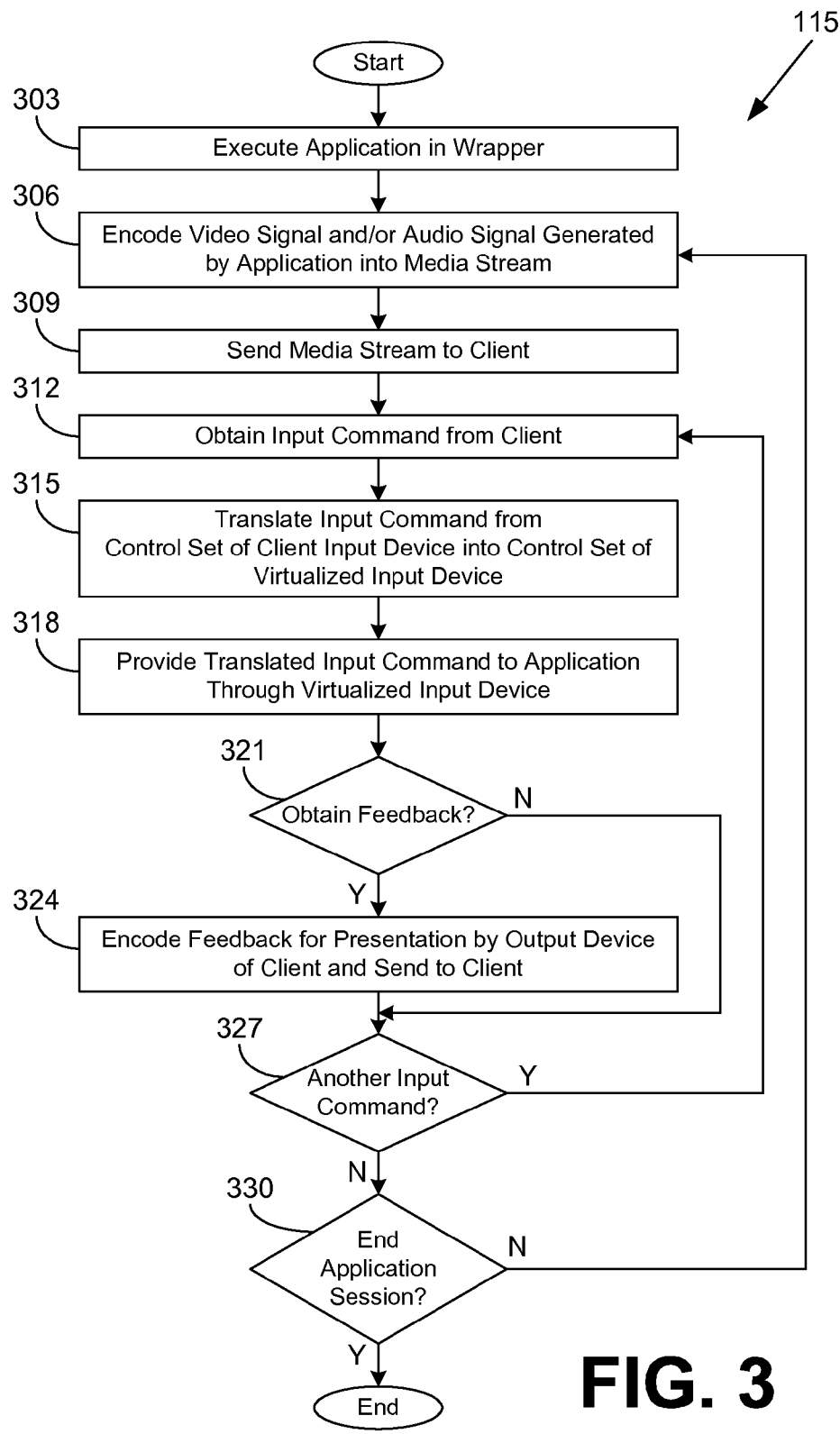

APPLICATION CONTROL TRANSLATION

BACKGROUND

Many forms of input devices exist to facilitate user input for an application that has a user interface. Various types of input devices may include joysticks, keyboards, mice, pointing sticks, touch pads, touch screens, light guns, game controllers, microphones, and so on. Such devices are typically directly connected to the computing device on which the application is executed, either through a wired connection or a wireless connection.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a flowchart illustrating one example of functionality implemented as portions of a server application executed in a computing device in the networked environment of FIG. 1 according to various embodiments of the present disclosure.

DETAILED DESCRIPTION

The present disclosure relates to control of applications executed in a hosted or virtualized environment. An application may be written for execution in a particular type of computing device with specific input and output devices. As a non-limiting example, an application may be written for a smartphone platform that generally has access to an accelerometer. Consequently, the application may expect to obtain some type of control input from the accelerometer. However, when the application is executed in a hosted or virtualized environment, the application might be controlled by a client computing device without an accelerometer. In addition, the application may expect to provide output through a vibration device generally available on the smartphone platform, though the client computing device might not include any type of vibration device.

Various embodiments of the present disclosure facilitate translation of control inputs and outputs in an application via configurable mappings and interfaces. Consequently, when a client computing device lacks an accelerometer, a substitute control mapping may be made using a mouse or other available input device. Likewise, if a vibration device is absent, the video from the application may be configured to blur or shake or some other indication may be communicated to the user. A hierarchy of mappings may be provided, including, for example, default mappings for a virtualized environment, default mappings for an application, and user-customized mappings. In the following discussion, a general description of the system and its components is provided, followed by a discussion of the operation of the same.

Figure 1:
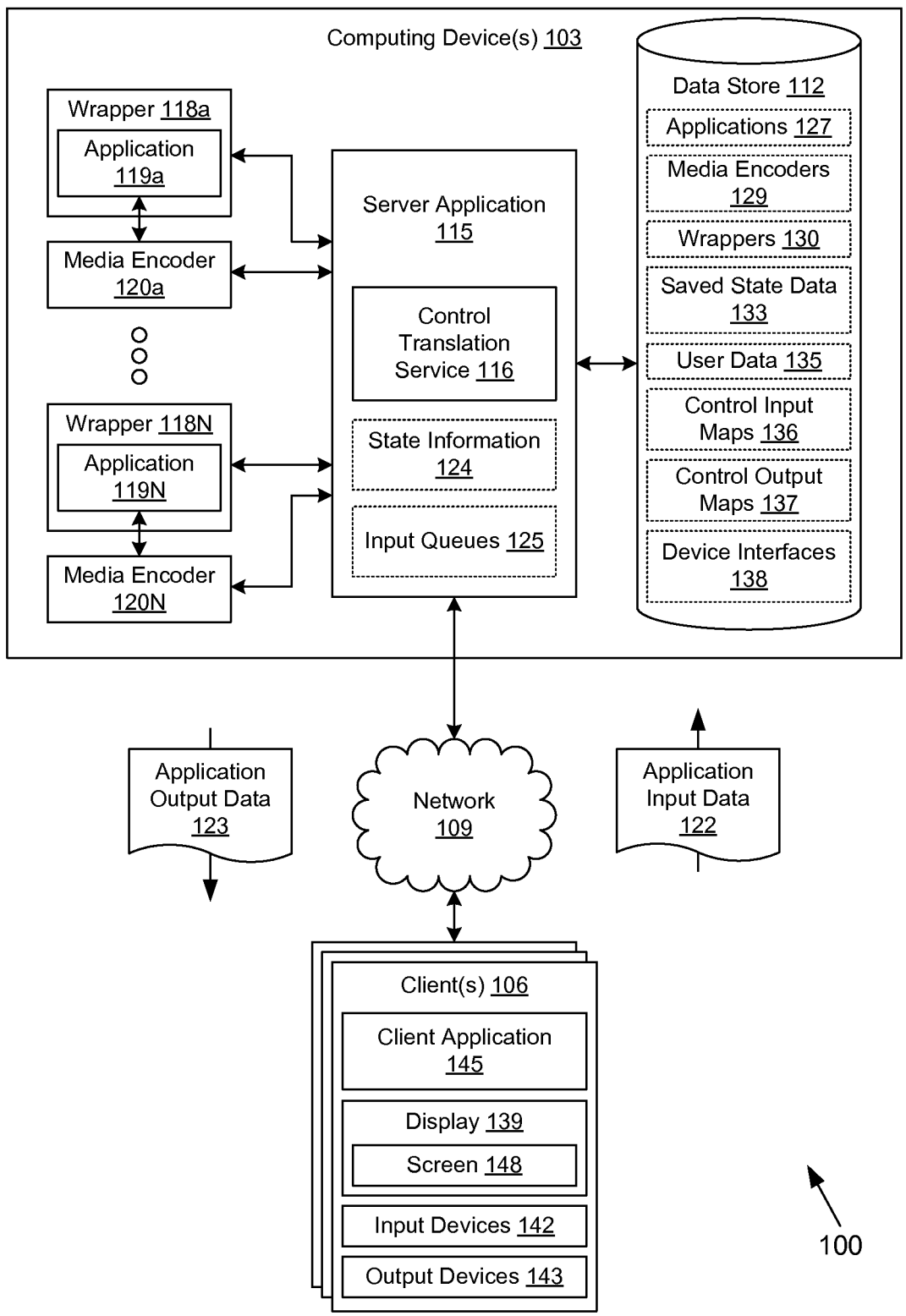
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks. Although the networked environment 100 is described as using a client-server architecture, a peer-to-peer architecture may also be employed. For example, the computing devices 103 and the clients 106 may correspond to peers within a peer-to-peer networked environment 100.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, a control translation service 116, a plurality of wrappers 118a . . . 118N, a plurality of applications 119a . . . 119N, a plurality of media encoders 120a . . . 120N, and other applications, services, processes, systems, engines, or functionality not discussed in detail herein. The server application 115 may correspond to a game server application or another type of application session server. The server application 115 is executed to launch applications 119, which are executed within the wrappers 118. The server application 115 is also executed to obtain application input data 122 from the clients 106 and provide the application input data 122 to the respective wrapper 118.

The server application 115 is also executed to send application output data 123 that is captured from the application 119 to the clients 106. The server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain state information 124 and input queues 125 associated with the executing applications 119.

The control translation service 116 is executed in conjunction with the server application 115 to translate input commands from the client 106 in the application input data 122 into input commands that may be provided to the application 119 by way of virtualized input devices of the wrapper 118. The translation performed by the control translation service 116 is configured through customizable mappings. At the least, the control translation service 116 may be configured to map inputs with like virtualized input devices of the wrapper 118. For example, an input generated by a mouse in the client 106 may be mapped to a virtualized mouse of the wrapper 118.

The control translation service 116 may also perform dissimilar mappings, such as between a mouse at the client 106 and a virtualized touchscreen of the wrapper 118. To this end, the control translation service 116 may modify the interface served up through the server application 115 to include user interface components that facilitate the generation of inputs in the client 106 through the input devices that are present. Furthermore, the control translation service 116 may map feedback from virtualized haptic devices and/or other virtualized output devices of the wrapper 118 with output devices of the client 106.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be a game originally designed for execution in a general-purpose computing device or in a specialized video game device such as, for example, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted environment for execution of the application 119. In various embodiments, the wrapper 118 may be configured to provide a virtualized environment for the application 119 by virtualizing one or more of the resources that the application 119 expects to access. Such resources may include a keyboard, a mouse, a joystick, a video device, a sound device, etc. In this way, the wrapper 118 is able to provide input commands to the application 119 as if the wrapper 118 emulates a keyboard, a mouse, an accelerometer, a touch screen, or another type of input device.

Further, the wrapper 118 is able to obtain a video signal generated by the application 119 as if the wrapper 118 emulates a display device, an audio device, or another type of output device. The wrapper 118 is able to encode the video signal and/or audio signal by way of a media encoder 120 into a media stream. To this end, the wrapper 118 may include various types of media encoders 120, such as, for example, Moving Pictures Experts Group (MPEG) encoders, H.264 encoders, Flash® media encoders 120, etc. Such media encoders 120 may be selected according to factors such as, for example, data reduction, encoding quality, latency, etc. In some embodiments, the wrappers 118 may communicate directly with the clients 106 to obtain the application input data 122 and to serve up the application output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized video game device or another type of computing device, the wrapper 118 may include an emulation application that emulates the device. In some embodiments, the output of the application 119 may be captured by the wrapper 118 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections.

The state information 124 that is maintained by the server application 115 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends. The input queues 125 collect input commands from the application input data 122 for a given application 119. The input commands may be reordered to a correct sequence and delays may be inserted between commands to ensure that they are interpreted correctly when presented to the corresponding application 119.

The data stored in the data store 112 includes, for example, applications 127, media encoders 129, wrappers 130, saved state data 133, user data 135, control input maps 136, control output maps 137, device interfaces 138, and potentially other data. The applications 127 correspond to a library of different applications that are available to be launched as applications 119. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 119 for multiple application sessions.

The media encoders 129 correspond to the various types of media encoders 120 that may be employed in the computing device 103. Some media encoders 129 may correspond to specific formats, such as, for example, H.264, MPEG-4, MPEG-2, and/or other formats. The wrappers 130 correspond to the executable code that implements the various types of wrappers 118. The wrappers 130 are executable in the computing device 103 and may be executed as multiple instances of the wrappers 118 for multiple application sessions.

The saved state data 133 corresponds to application states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 135 includes various data related to the users of the applications 119, such as, for example, security credentials, application preferences, billing information, a listing of other users that are permitted to join application sessions started by the user, and so on.

The control input maps 136 are configured to map application input data 122 from clients 106 to input commands to be generated by virtualized input devices of the wrapper 118 and provided to the application 119. The control output maps 137 are configured to map feedback and/or other output data to output in the client 106. Such output may comprise a modified media stream and/or output through other output devices of the client 106. The control input maps 136 and the control output maps 139 may be user-configured or pre-established by an administrator of the computing device 103. In one embodiment, the control input maps 136 and the control output maps 139 may be dynamically configured or reconfigured on the fly by a user.

The control input maps 136 and the control output maps 139 may be hierarchically organized. In one non-limiting example of a hierarchical organization, a first level may comprise default control input maps 136 for the virtualized device. The first level may be overridden by a more specific second level that comprises default control input maps 136 for an application 119. The second level, in turn, may be overridden by an even more specific third level that comprises user-customized control input maps 136. It is understood that many other levels or organizations for the control input maps 136 and the control output maps 139 may be employed in other embodiments. Additionally, multiple different sets of control input maps 136 and control output maps 139 may be provided and selected by the user. For example, there may be a hands-free set of mappings and a hand-on set of mappings, a landscape set of mappings and a portrait set of mappings, and so on.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, touch screens, push buttons, optical sensors, microphones, webcams, and/or any other devices that can provide user input. Additionally, various input devices 142 may incorporate haptic technologies in order to provide feedback to the user. The output devices 143 may correspond to the output sections of haptic input devices 142, vibration devices, buzzing devices, audio devices, indicator lights, seven-segment display devices, and so on.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input commands provided by the user through one or more of the input devices 142 and send this input over the network 109 to the computing device 103 as application input data 122.

The client application 145 is also configured to obtain application output data 123 over the network 109 from the computing device 103 and render a screen 148 on the display 139. To this end, the client application 145 may include one or more video and audio players to play out a media stream generated by an application 119. In one embodiment, the client application 145 comprises a plug-in within a browser application. The client 106 may be configured to execute applications beyond the client application 145 such as, for example, browser applications, email applications, instant message applications, and/or other applications. In some embodiments, multiple clients 106 may be employed for one or more users to interact with the application 119. As non-limiting examples, some clients 106 may be specialized in display output, while other clients 106 may be specialized in obtaining user input. It is noted that different clients 106 may be associated with different latency requirements which may affect a delay employed before providing input commands to the application 119.

Next, a general description of the operation of the various components of the networked environment 100 is provided. To begin, a user at a client 106 sends a request to launch an application 119 to the server application 115. The server application 115 obtains the corresponding application 127, media encoder 129, and wrapper 130 from the data store 112. The server application 115 then launches the application 119 in the corresponding wrapper 118. The server application 115 tracks the status of the application 119 within the state information 124.

The wrapper 118 provides a hosted environment for execution of the application 119. In some embodiments, the hosted environment may include a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access. Furthermore, the wrapper 118 may virtualize input devices such as, for example, keyboards, mice, etc. which may not actually be present in the computing device 103. In various embodiments, the wrapper 118 may correspond to a virtual machine and/or the wrapper 118 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the application input data 122. The server application 115 receives the input command, adds it to the input queue 125 for the application 119, and ultimately passes it to the wrapper 118. In some cases, the input command or a group of input commands may be translated from a form associated with one type of input device 142 into a translated form associated with a virtualized input device provided by the wrapper 118.

In some embodiments, other different input commands may be presented to the application 119 from those that were generated by a client 106. As a non-limiting example, if a user sends a mouse down command and the client application 145 loses focus, the wrapper 118 may be configured to send a mouse down command followed by a mouse up command. In various embodiments, the input commands may be relayed to the wrapper 118 as soon as possible, or the input commands may be queued by the wrapper 118 in the input queue 125 and relayed to the application 119 sequentially from the queue according to another approach.

Meanwhile, the graphical output of the application 119 is captured by the wrapper 118 and encoded into a media stream. Additionally, the audio output of the application 119 may be captured and multiplexed into the media stream. The graphical output and/or audio output of the application 119 may be captured by hardware devices of the computing device 103 in some embodiments. The media stream is transmitted by the server application 115 to the client 106 over the network 109 as the application output data 123. The client application 145 obtains the application output data 123 and renders a screen 148 on the display 139.

Subsequently, other users may join the application 119 and participate like the first user. A user may start an application 119 at one client 106 and continue the application 119 at another client 106. Furthermore, multiple users at diverse locations may participate in an application 119. As a non-limiting example, an application 119 may have been developed to be executed in one device with multiple game controllers. Accordingly, the control translation service 116 may be configured to map input commands from one client 106 to a first virtual game controller and input commands from another client 106 to a second virtual game controller. As another non-limiting example, an application 119 may have been developed to be executed in one device, where one side of the keyboard controls the first player and the other side of the keyboard controls the second player. Accordingly, the control translation service 116 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the control translation service 116 into input commands provided to the application 119 through an entirely different type of virtual input device. The server application 115 may be configured to perform discovery or otherwise obtain an input device configuration and/or an output device configuration from the client 106. As a non-limiting example, input generated by an accelerometer in the client 106 may be translated by the wrapper 118 into input provided through a virtual mouse. Thus, completely different kinds of input devices 142 with different control sets may be used in connection with the application 119. Such input devices 142 and control sets might not have been contemplated when the application 119 was implemented.

Further, gestures, or combinations of input commands generated through a type of input device, may be mapped to other input commands generated through another type of input device. For example, a pinch gesture corresponding to two fingers moving together on a touchscreen may be used by an application 119 to enable zooming out on a window. Suppose that the client 106 does not have a touchscreen. The pinch gesture may be mapped to a right click of a mouse or to some other action with an available input device of a client 106.

Where the input devices 142 incorporate haptic technologies and devices, force feedback may be provided to the input devices 142 within the application output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the application input data 122 of one client 106 may be included in the application output data 123 sent to another client 106. Force feedback or other output data may be mapped to different output devices 143 of the client 106. For example, a vibration device of a virtualized smartphone may be mapped to an audio sample to be played out on another type of client 106 without a vibration device.

The mappings of input devices 142 to virtualized input device and of virtualized output devices to output devices 143 may be maintained according to data in the control input maps 136 or the control output maps 137. Such mappings may be maintained in a hierarchy from more generic to more specific. The mappings may also be user configurable. By facilitating the mapping of inputs, a user may employ a preferred control scheme that is translated into a control scheme that may be required by an application 119. It is noted that the translation may relate to a virtualized input device that is the same type of input device 142 as that present in the client 106, or to a virtualized input device that is a different type of input device 142. Likewise, the translation may relate to a virtualized output device that is the same type of output device 143 as that present in the client 106, or to a virtualized input device that is a different type of output device 143. Additionally, it is noted that portions of the translation may occur in the client application 145 in some embodiments.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded as needed to meet the hardware requirements of the latest and most computationally intensive applications 119. In various embodiments, the video signal in the media stream sent by the server application 115 may be scaled according to the bitrate and/or other characteristics of the connection between the computing device 103 and the client 106 over the network 109.

Various techniques related to providing input commands to applications 119 that are executed remotely are described in U.S. patent application entitled "Sending Application Input Commands over a Network" filed on Dec. 15, 2010 and assigned application Ser. No. 12/968,845, and in U.S. patent application entitled "Remotely Emulating Computing Devices" filed on May 24, 2011 and assigned application Ser. No. 13/114,534, all of which are incorporated herein by reference in their entirety.

Figure 2A:
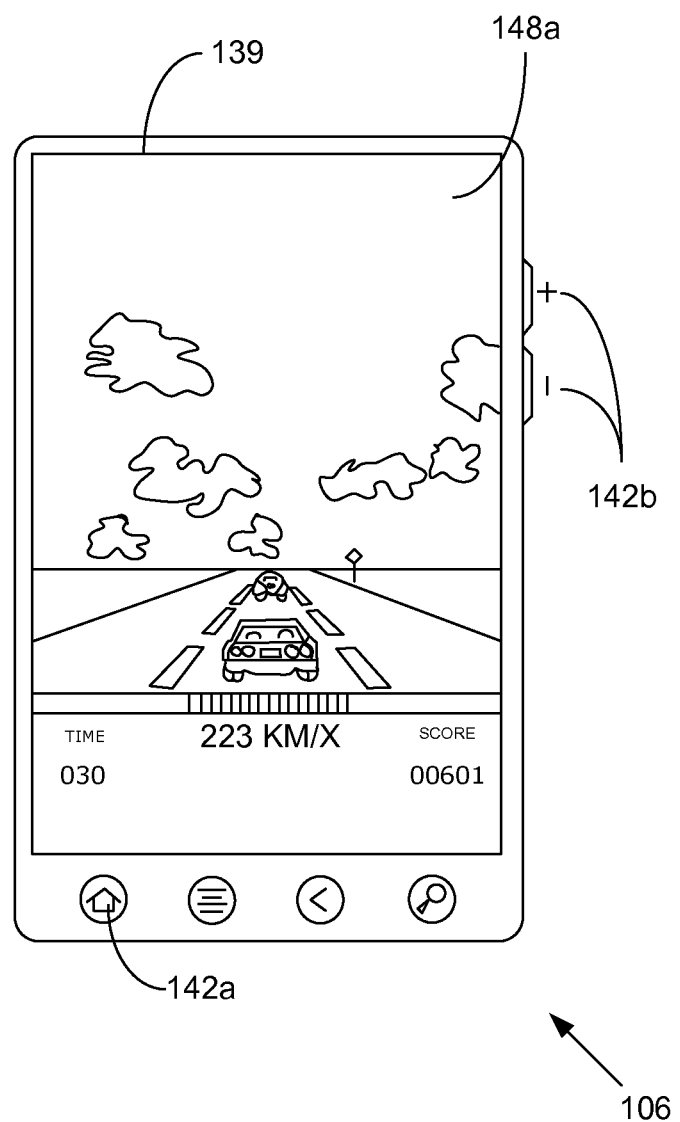
FIG. 2A is a drawing of an example of a client employed in the networked environment of FIG. 1 according to various embodiments of the present disclosure.

Turning now to FIG. 2A, shown is one example of a client 106 employed in the networked environment 100 (FIG. 1). In the non-limiting example of FIG. 2A, the client 106 is a smartphone. The display 139 of the client 106 is a touchscreen. Rendered upon the touchscreen by the client application 145 (FIG. 1) is a screen 148a corresponding to the visual output of an application 119 (FIG. 1). Also shown in FIG. 2A as being a part of the client 106 are input devices 142a and 142b that are buttons. The input devices 142b correspond to volume controls for the client 106. An audio device of the client 106 may be configured to play out an audio signal generated by the application 119.

The application 119 corresponds to a racing game application 119 that is native to a smartphone platform. Rather than being executed in the client 106, the application 119 is executed in the hosted environment of a wrapper 118 (FIG. 1) that emulates a smartphone device. The wrapper 118 is further configured to virtualize various input and/or output devices of smartphone device for the application 119. In this particular racing game application 119, the user is able to steer a vehicle shown on the screen 148a by rotating the client 106. Because the client 106 in this example includes an accelerometer input device 142, the rotation generates an input command or input data. The input command or input data is then interpreted by the application 119 as steering the vehicle left or right.

When a user rotates the client 106, the input command is sent by the client application 145 over the network 109 (FIG. 1) to the server application 115 (FIG. 1). The control translation service 116 (FIG. 1) translates the accelerometer rotation from the accelerometer input device 142 into an accelerometer rotation to be provided to the application 119 through a virtualized accelerometer of the wrapper 118. Where the virtualized accelerometer and the accelerometer input device 142 employ the same application programming interface (API), the translation may be simply passing through the input command.

Other input, if desired, may be mapped to the virtualized accelerometer input provided to the application 119 as specified in the control input maps 136 (FIG. 1). For example, the user may map a finger stroke on the touchscreen that moves left to be a counter-clockwise rotation input command for the virtualized accelerometer. Thus, by moving a finger toward the left on the touchscreen, the vehicle may be steered toward the left in response.

Figure 2B:
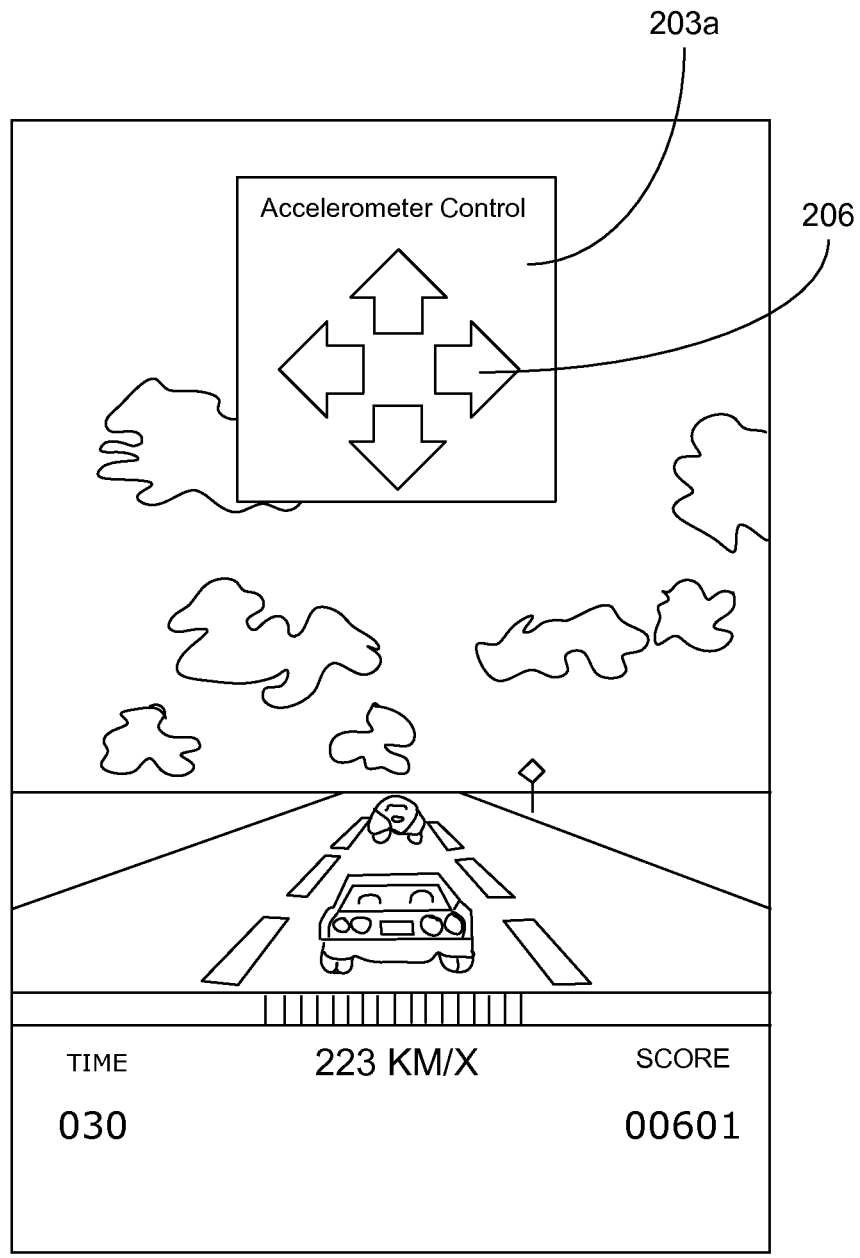
FIGS. 2B and 2C are drawings of examples of screens rendered in a client employed in the networked environment of FIG. 1 according to various embodiments of the present disclosure.

Moving on to FIG. 2B, shown is one example of a screen 148b rendered in a client 106 (FIG. 1) employed in the networked environment 100 (FIG. 1). The client 106 associated with FIG. 2B in this non-limiting example may correspond to a desktop workstation. Rather than being rendered upon a display 139 (FIG. 1) that is a touchscreen of a mobile handheld as in FIG. 2A, the screen 148b of FIG. 2B is rendered upon a display 139 that is a standalone flat-panel monitor. In some embodiments, representations of the input devices 142a and 142b (FIG. 2A) may be provided in order for a user to interact with the application 119 (FIG. 1) through virtualized forms of the input devices 142a and 142b.

Because the client 106 of FIG. 2B lacks an accelerometer, the steering input to the application 119 (FIG. 1) is generated by way of one or more alternate input devices 142. Suppose that a mouse input device 142 is used to provide the steering input. An interface 203a corresponding to a mouse-enabled accelerometer control may be employed. The interface 203a may be included by the client application 145 (FIG. 1) or by the server application 115 (FIG. 1) within the media stream. Data to define the interface 203a may be stored in the device interfaces 138 (FIG. 1).

The interface 203a includes four arrow-shaped buttons 206 that may be selected by a mouse cursor to generate accelerator left, up, down, or right input. The accelerator left, up, down, or right input may then be provided to the application 119 through a virtualized accelerator of the wrapper 118. Other interfaces 203, such as a graphical representation of a smartphone that may be rotated by clicking and dragging a mouse cursor, may be employed in other examples. Where a graphical representation of a smartphone or other device is employed, a screen of the graphical representation may be configured to render at least a portion of the video signal from the media stream.

In one embodiment, the interface 203a is embedded into the video signal of the media stream, and mouse input is sent to the server application 115. The control translation service 116, being aware of the interface, translates the mouse input into the appropriate accelerator input to be provided to the application 119. For example, when a user selects the left button 206 with a mouse click, the mouse click may be sent over the network 109 to the server application 115. The control translation service 116 maps the mouse click in the defined area of the left button 206 to a counter-clockwise accelerometer rotation, which is provided to the application 119 through the virtualized accelerometer. Consequently, a left steer action in the game is accomplished.

In another embodiment, the interface 203a is rendered in the client 106 by the client application 145 according to data provided by the server application 115. In such an embodiment, the client application 145 may be configured to perform the input translation such that data describing a counter-clockwise accelerometer rotation is sent over the network 109 to the server application 115. The counter-clockwise accelerometer rotation is then provided to the application 119 through the virtualized accelerometer, and a left steer action in the game is likewise accomplished.

It is noted that multiple input devices 142 may be mapped to the accelerometer inputs. For example, keyboard input device 142 inputs (e.g., the arrow keys or other keys) may be mapped to accelerometer motions. Further, a steering input device 142 with a steering wheel may be coupled to the client 106. Such an input device 142 might not employ an interface 203a. A left turn of the steering wheel may be translated by the control translation service 116 into a counter-clockwise accelerometer rotation and provided to the application 119 by a virtualized accelerometer.

The application control translation may occur in the opposite direction as well. As a non-limiting example, the application 119 may be configured to actuate a vibration output device 143 (FIG. 1) present on the smartphone platform when the steering action generated by the accelerometer is excessive. However, the vibration output device 143 may be absent from the client 106 employed in the example of FIG. 2B. Consequently, the application 119 may actuate vibration in a virtualized vibration device of the wrapper 119, and the control translation service 116 may translate the vibration into another action depending on the control output maps 137 (FIG. 1). For example, the media stream may be altered such that the video signal appears shaken or blurred to indicate vibration.

Suppose that the steering wheel input device 142 is a haptic control device that includes an output device 143 providing force feedback. The control translation service 116 may then encode the vibration output for presentation in the client 106 through the output device 143 of the steering wheel according to the control output maps 137. The steering wheel force feedback output data is then sent over the network 109 to the client application 145. The client application 145 can then provide the translated output data to the output device 143. Alternatively, the vibration output may be sent over the network 109, and the translation to the steering wheel force feedback may occur in the client 106.

Figure 2C:
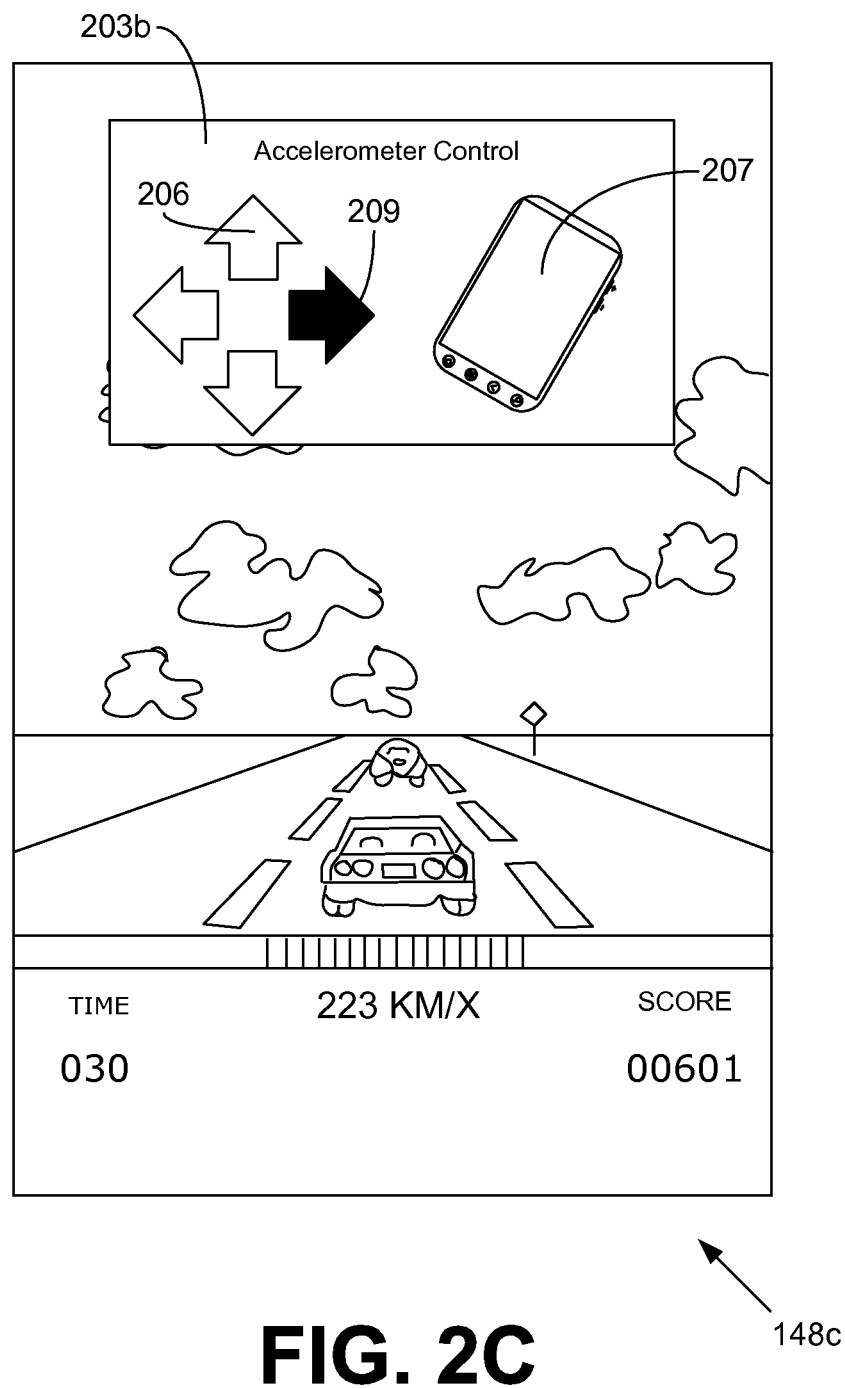

With reference to FIG. 2C, shown is another example of a screen 148c rendered in a client 106 (FIG. 1) employed in the networked environment 100 (FIG. 1). Compared with the screen 148b and the interface 203a of FIG. 2B, the screen 148c includes an interface 203b that adds a feedback display 207, which visually represents the input command sent using the buttons 206. In this case, the feedback display 207 shows a graphical representation of a smartphone that has been rotated in accordance with an accelerometer input command provided by the user through the interface 203b.

As shown in FIG. 2C, one of the buttons 206, the selected button 209, is shown highlighted representing a selection by a user. As a non-limiting example, the length of time the selected button 209 is held may indicate a magnitude of rotation in that direction. As another non-limiting example, a repetition of selections for the selected button 209 may increase the rotation. The magnitude of rotation clockwise according to the selected button 209 is indicated by the feedback display 207.

Referring next to FIG. 3, shown is a flowchart that provides one example of the operation of a portion of the server application 115 according to various embodiments. It is understood that the flowchart of FIG. 3 provides merely an example of the many different types of functional arrangements that may be employed to implement the operation of the portion of the server application 115 as described herein. As an alternative, the flowchart of FIG. 3 may be viewed as depicting an example of steps of a method implemented in the computing device 103 (FIG. 1) according to one or more embodiments.

Beginning with box 303, the server application 115 executes an application 119 (FIG. 1) in a wrapper 118 (FIG. 1). In box 306, the server application 115 encodes a video signal and/or audio signal generated by the application 119 into a media stream by way of a media encoder 120 (FIG. 1). In box 309, the server application 115 sends the media stream to a client 106 (FIG. 1) over the network 109 (FIG. 1) in the application output data 123 (FIG. 1).

In box 312, the server application 115 obtains an input command from the client 106 over the network 109 in the application input data 122 (FIG. 1). In box 315, the server application 115 uses the control translation service 116 (FIG. 1) to translate the input command from the control set of a client input device 142 (FIG. 1) into a control set of a virtualized input device of the wrapper 118. To this end, the control translation service 116 consults the control input maps 136 (FIG. 1). In some cases, input commands from the client input device 142 may be mapped to more or fewer input commands of the virtualized input device. In box 318, the server application 115 provides the translated input command(s) to the application 119 through the virtualized input device of the wrapper 118.

In box 321, the server application 115 determines whether feedback or other output data is to be obtained from the application 119 through one or more virtualized output devices of the wrapper 118. If so, the server application 115 proceeds from box 321 to box 324 and then encodes the feedback or other output data for presentation by an output device 143 (FIG. 1) of the client 106 according to the control output maps 137 (FIG. 1). The server application 115 then proceeds to box 327. If feedback or other output data is not to be obtained, the server application 115 proceeds from box 321 to box 327.

In box 327, the server application 115 determines whether another input command is provided. If another input command is provided, the server application 115 returns to box 312 and obtains the next input command from the client 106. If no other input command is provided, the server application 115 transitions instead from box 327 to box 330. In box 330, the server application 115 determines whether the application 119 session is to be ended. If the session is not to be ended, the server application 115 returns to box 306 and continues encoding the media stream. Otherwise, if the session is to be ended, the portion of the server application 115 ends.

Figure 4:
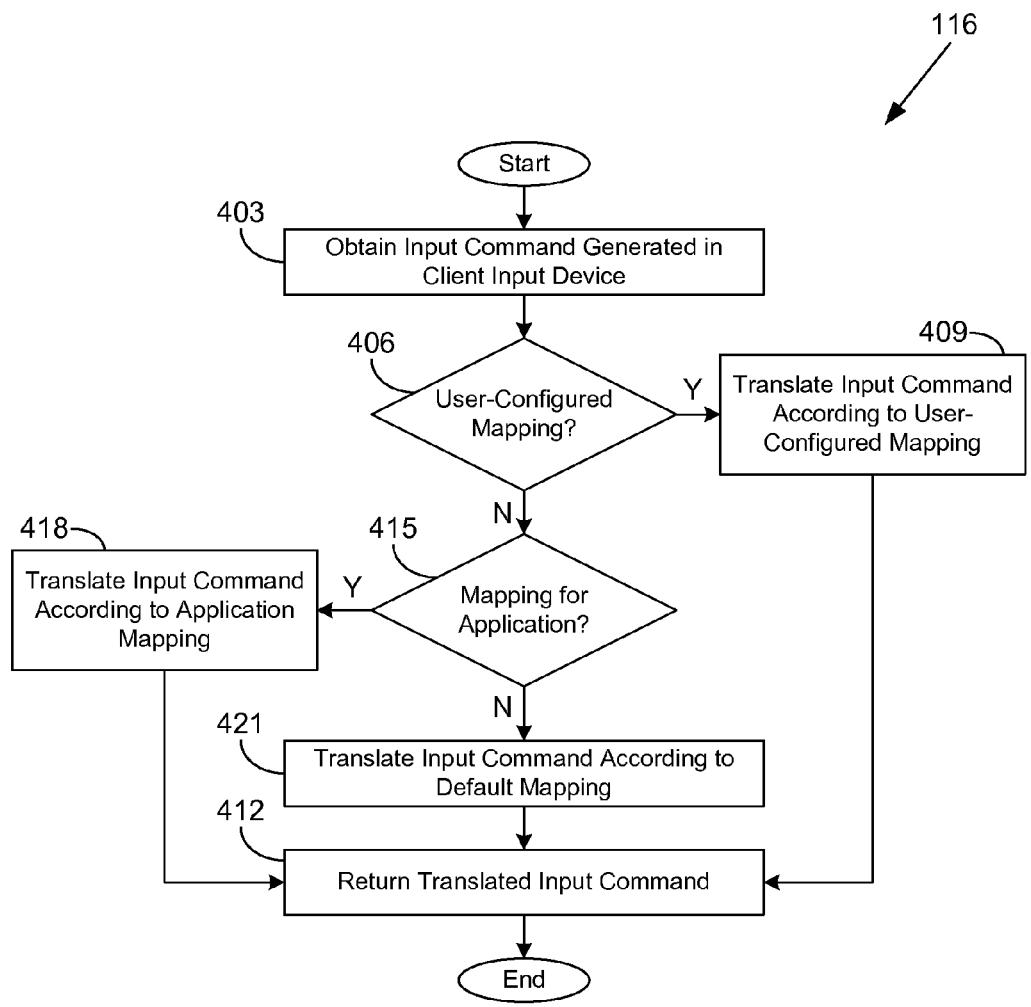
FIG. 4 is a flowchart illustrating one example of functionality implemented as portions of a control translation service executed in a computing device in the networked environment of FIG. 1 according to various embodiments of the present disclosure.

Continuing on to FIG. 4, shown is a flowchart that provides one example of the operation of a portion of the control translation service 116 according to various embodiments. It is understood that the flowchart of FIG. 4 provides merely an example of the many different types of functional arrangements that may be employed to implement the operation of the portion of the control translation service 116 as described herein. As an alternative, the flowchart of FIG. 4 may be viewed as depicting an example of steps of a method implemented in the computing device 103 (FIG. 1) according to one or more embodiments. Although three specific types of control input maps 136 (FIG. 1) are highlighted in FIG. 4, this corresponds merely to one non-limiting example. Any number of different control input maps 136 may be employed in other embodiments.

Beginning with box 403, the control translation service 116 obtains one or more input commands generated in an input device 142 (FIG. 1) of a client 106 (FIG. 1). In box 406, the control translation service 116 determines whether the control input maps 136 (FIG. 1) include a user-configured mapping of the input commands from the input device 142 to a virtualized input device of the wrapper 118. Such a user-configured mapping may be defined for the application 119 (FIG. 1), the computing device virtualized by the wrapper 118 (FIG. 1), and/or for any applications 119 or wrappers 118.

If there is a corresponding user-configured mapping in the control input maps 136, the control translation service 116 translates the input command(s) according to the user configured mapping in box 409. The control translation service 116 then returns the translated input command(s) in box 412. Thereafter, the portion of the control translation service 116 ends.

If, instead, there is no corresponding user-configured mapping in the control input maps 136, the control translation service 116 transitions from box 406 to box 415 and determines whether there is a default mapping specific to the application 119. If there is a mapping specific to the application 119, the control translation service 116 moves to box 418 and translates the input command(s) according to the application-level mapping in the control input maps 136. The control translation service 116 returns the translated input command(s) in box 412. Thereafter, the portion of the control translation service 116 ends.

If, instead, there is no default mapping specific to the application 119, the control translation service 116 moves from box 415 to box 421. In box 421, the control translation service 116 translates the input command(s) according to a default mapping of the control input maps 136. Such a default mapping may be specific to the particular wrapper 118 or emulated computing device. In box 412, the control translation service 116 returns the translated input commands. Thereafter, the portion of the control translation service 116 ends.

Figure 5:
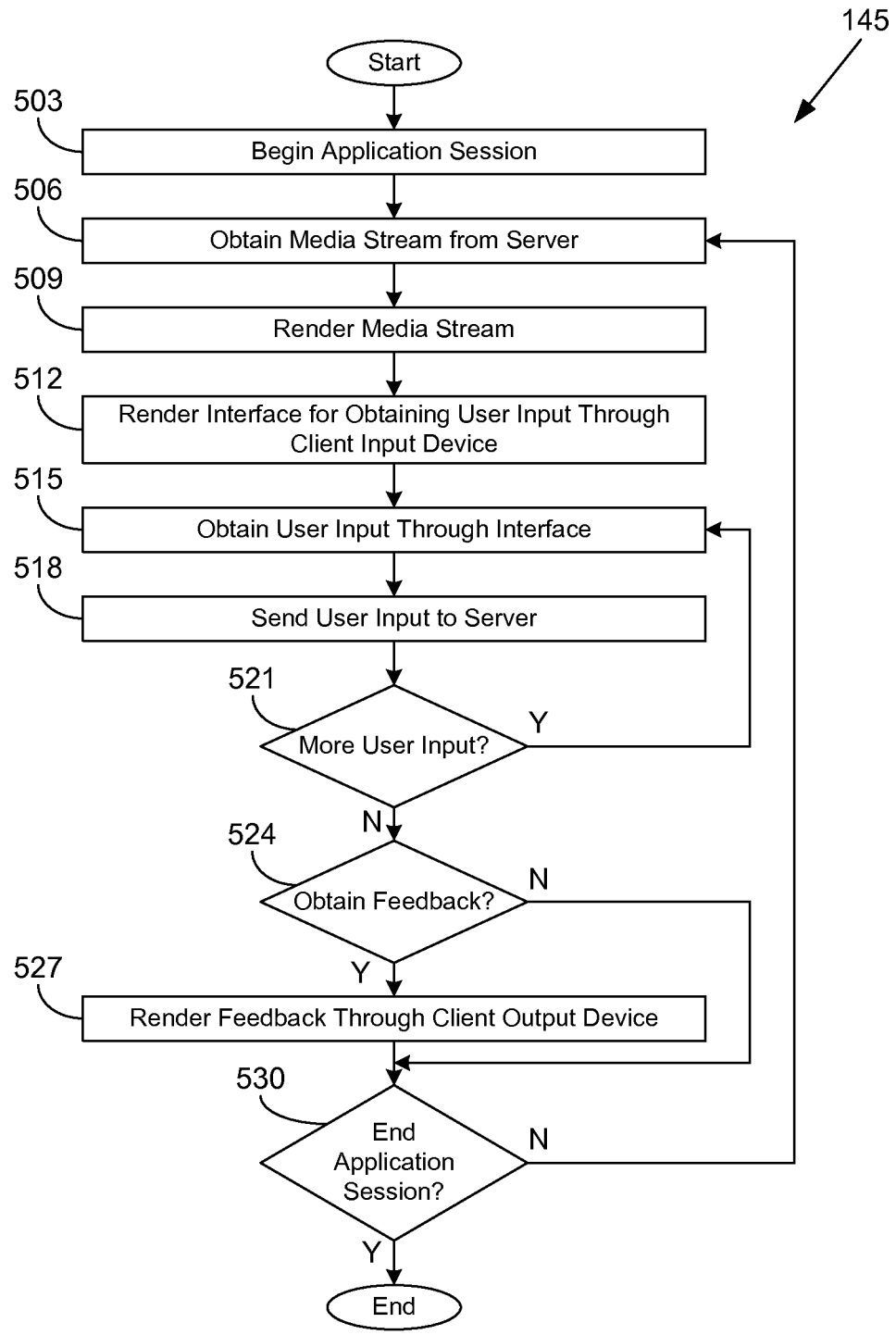
FIG. 5 is a flowchart illustrating one example of functionality implemented as portions of a client application executed in a client in the networked environment of FIG. 1 according to various embodiments of the present disclosure.

Turning now to FIG. 5, shown is a flowchart that provides one example of the operation of a portion of the client application 145 according to various embodiments. It is understood that the flowchart of FIG. 5 provides merely an example of the many different types of functional arrangements that may be employed to implement the operation of the portion of the client application 145 as described herein. As an alternative, the flowchart of FIG. 5 may be viewed as depicting an example of steps of a method implemented in the client 106 (FIG. 1) according to one or more embodiments.

Beginning with box 503, the client application 145 begins a session of an application 119 (FIG. 1) executed by a wrapper 118 (FIG. 1) in the computing device 103 (FIG. 1). In box 506, the client application 145 obtains the media stream over the network 109 (FIG. 1) from the server application 115 (FIG. 1) in the application output data 123 (FIG. 1). In box 509, the client application 145 renders the media stream. For example, the client application 145 may render a video signal of the media stream on a display 139 (FIG. 1) as a screen 148 (FIG. 1). Also, the client application 145 may render an audio signal of the media stream through an audio output device 143 (FIG. 1) of the client 106. In box 512, the client application 145 may render an interface 203 (FIG. 2B) for obtaining user input for the application 119 through an input device 142 (FIG. 1) of the client 106.

In box 515, the client application 145 obtains user input either directly or through the interface 203. In box 518, the client application 145 sends the user input to the server application 115 over the network 109 in the application input data 122 (FIG. 1). In box 521, the client application 145 determines whether more user input is to be obtained. If more user input is to be obtained, the client application 145 returns to box 515 and obtains additional user input. If more user input is not to be obtained, the client application 145 instead proceeds to box 524.

In box 524, the client application 145 determines whether feedback or other output data is obtained from the server application 115. If feedback or other output data is obtained, then in box 527, the client application 145 renders the feedback or other output data through one or more client output devices 143. The client application 145 continues to box 530. If feedback or other output data is not obtained, the client application 145 instead transitions from box 524 to box 530. In box 530, the client application 145 determines whether the session of the application 119 has ended. If the session has not ended, the client application 145 returns to box 506 and continues obtaining the media stream from the server application 115. Otherwise, the portion of the client application 145 ends.

Figure 6:
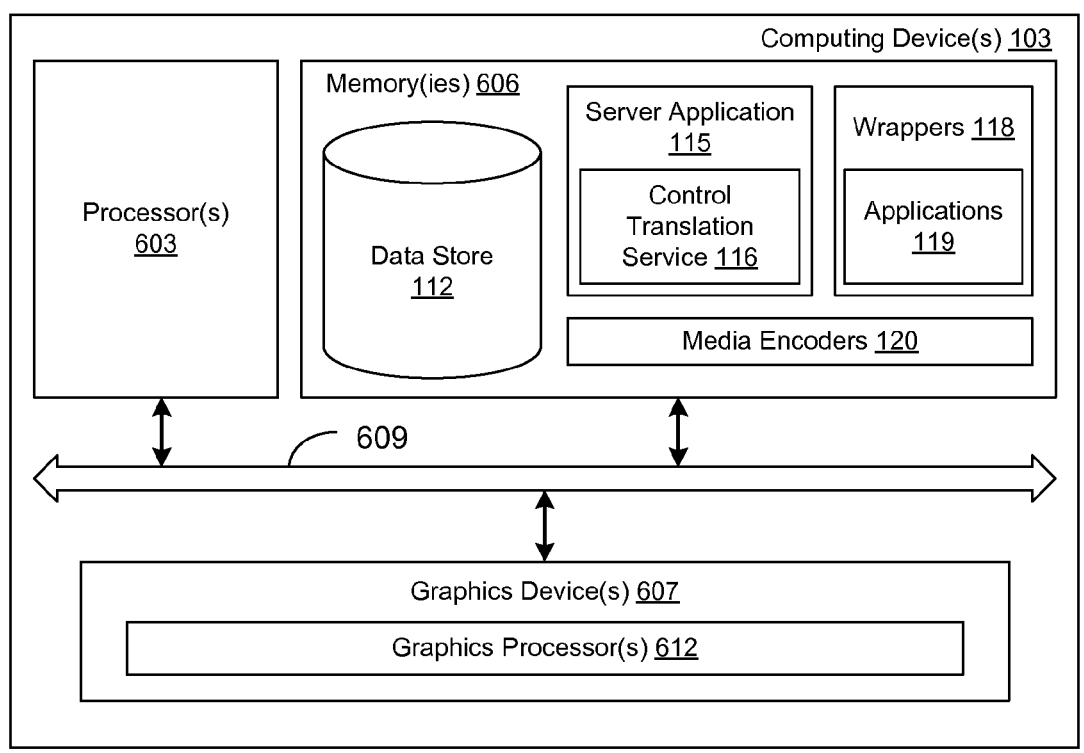
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603, a memory 606, and one or more graphics devices 607, all of which are coupled to a local interface 609. To this end, the computing device 103 may comprise, for example, at least one server computer or like device. The local interface 609 may comprise, for example, a data bus with an accompanying address/control bus or other bus structure as can be appreciated. The graphics devices 607 may correspond to high-performance graphics hardware, including one or more graphics processors 612. The graphics devices 607 are configured to render graphics corresponding to the applications 119 executed in the computing device 103.

Stored in the memory 606 are both data and several components that are executable by the processor 603. In particular, stored in the memory 606 and executable by the processor 603 are the server application 115, the control translation service 116, the wrappers 118, the applications 119, the media encoders 120, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the server application 115, the control translation service 116, the wrappers 118, the applications 119, the media encoders 120, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the client application 145, the control translation service 116, and the server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the control translation service 116, the wrappers 118, the applications 119, the media encoders 120, and the client application 145, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that executes an application in a virtualized computing device in a hosted environment, the virtualized computing device including a first input device and a first output device that are virtualized for the application;
    code that encodes a video signal and an audio signal that are generated by the application into a media stream;
    code that sends the media stream to a client through a data communications network;
    code that obtains input data from the client through the data communications network, the input data being generated in a second input device of the client;
    code that provides a translated form of the input data to the application through the first input device, the input data being translated from a control set associated with the second input device into a translated control set that is associated with the first input device;
    code that obtains output data from the application through the first output device;
    code that sends the output data to the client through the data communications network, the output data being encoded for presentation in the client through a second output device of the client;
    wherein the first input device and the second input device correspond to different types of input devices, and the first output device and the second output device correspond to different types of output devices; and
    wherein the input data is translated according to a hierarchy of control input mappings.

2. A system, comprising:
    at least one computing device; and
    a first application executable in the at least one computing device, the first application comprising:
    logic that executes a second application in a hosted environment that virtualizes a first input device for the second application;
    logic that encodes a video signal generated by the second application into a media stream;
    logic that sends the media stream to another computing device;
    logic that obtains input data from the other computing device, the input data being generated in a second input device of the other computing device;
    logic that provides a translated form of the input data to the second application through the first input device, the input data being translated from a form associated with the second input device into the translated form which is associated with the first input device; and wherein the input data is translated according to a hierarchy of control input mappings.

3. The system of claim 2, wherein the second application is executed in an emulated computing device that is virtualized by the hosted environment.

4. The system of claim 3, wherein the first application further comprises logic that encodes a user interface for rendering in the other computing device, the user interface including a graphical representation of the emulated computing device, wherein a screen of the graphical representation of the emulated computing device is configured to render at least a portion of the video signal from the media stream.

5. The system of claim 2, wherein the first application further comprises logic that sends an interface for generating the input data with the second input device to the other computing device.

6. The system of claim 5, wherein the interface is configured to generate the input data in the translated form, and the input data is obtained from the other computing device in the translated form.

7. The system of claim 2, wherein the translated form is required by the second application.

8. The system of claim 2, wherein the first input device and the second input device correspond to different types of input devices.

9. The system of claim 2, wherein the first input device and the second input device correspond to one type of input device.

10. The system of claim 2, wherein a first level of the hierarchy corresponds to a default control input mapping, a second level of the hierarchy corresponds to a default control input mapping for the second application, and a third level of the hierarchy corresponds to a user-customized control input mapping for the second application.

11. The system of claim 2, wherein the first application further comprises logic that determines an input device configuration of the other computing device, and the translated form is provided based at least in part on the input device configuration.

12. The system of claim 2, wherein the first application further comprises:
logic that obtains output data from the second application through a first output device that is virtualized by the hosted environment for the second application; and
logic that sends the output data to the other computing device, the output data being encoded for presentation in the other computing device through a second output device of the other computing device.

13. The system of claim 12, wherein the output data is translated from a form associated with the first output device into a translated form which is associated with the second output device.

14. The system of claim 12, wherein the first output device and the second output device correspond to different types of output devices.

15. The system of claim 12, wherein the output data is encoded for presentation in the other computing device by altering the media stream.

16. The system of claim 12, wherein the output data corresponds to feedback data, and the first input device and the first output device correspond to a haptic control device virtualized by the hosted environment.

17. The system of claim 12, wherein the first application further comprises logic that determines an output device configuration of the other computing device, and the output data is encoded based at least in part on the output device configuration.

18. A method, comprising the steps of:
obtaining, in a computing device, a media stream from another computing device, the media stream including a video signal generated by an application, the application being executed in a hosted environment that virtualizes a first input device for the application;
rendering, in the computing device, the media stream;
providing, in the computing device, an interface for obtaining user input by way of a second input device of the computing device, the interface being configured to facilitate translating the user input to a control set of the first input device;
obtaining, in the computing device, the user input in response to the media stream through the second input device of the computing device;
sending, in the computing device, the user input to the other computing device;
wherein the other computing device is configured to provide a translated form of the user input to the application through the first input device; and
wherein the user input is translated according to a hierarchy of control input mappings.

19. The method of claim 18, wherein a first level of the hierarchy corresponds to a default control input mapping, a second level of the hierarchy corresponds to a default control input mapping for the application, and a third level of the hierarchy corresponds to a user-customized control input mapping for the application.

20. The method of claim 18, further comprising the steps of:
obtaining, in the computing device, application output from the other computing device, the application output being generated by the application for rendering by a first output device virtualized by the hosted environment for the application; and
rendering, in the computing device, the application output through a second output device of the computing device, the application output being translated from a form associated with the first output device into a translated form associated with the second output device.

21. The method of claim 20, wherein the application output corresponds to feedback data, and the first input device and the first output device correspond to a haptic control device virtualized by the hosted environment.

22. The method of claim 18, wherein the first input device and the second input device employ different control sets.

* * * * *